US012394550B2

(12) United States Patent
Tepper et al.

(10) Patent No.: US 12,394,550 B2
(45) Date of Patent: Aug. 19, 2025

(54) TRANSFORMER COOLING SYSTEM

(71) Applicant: Hitachi Energy Ltd, Zürich (CH)

(72) Inventors: Jens Tepper, Wolfenbüttel (DE); Yong Wang, Brilon (DE)

(73) Assignee: Hitachi Energy Ltd, Zürich (CH)

( * ) Notice: Subject to any disclaimer, the term of this patent is extended or adjusted under 35 U.S.C. 154(b) by 376 days.

(21) Appl. No.: 17/630,252

(22) PCT Filed: Jul. 21, 2020

(86) PCT No.: PCT/EP2020/070536
§ 371 (c)(1),
(2) Date: Jan. 26, 2022

(87) PCT Pub. No.: WO2021/018668
PCT Pub. Date: Feb. 4, 2021

(65) Prior Publication Data

US 2022/0285068 A1 Sep. 8, 2022

(30) Foreign Application Priority Data

Jul. 26, 2019 (EP) .................................... 19188662

(51) Int. Cl.
*H01F 27/02* (2006.01)
*H01F 27/08* (2006.01)
(Continued)

(52) U.S. Cl.
CPC ......... *H01F 27/025* (2013.01); *H01F 27/085* (2013.01); *H01F 27/2876* (2013.01); *H01F 2027/328* (2013.01)

(58) Field of Classification Search
CPC .. H01F 27/025; H01F 27/085; H01F 27/2876; H01F 2027/328
(Continued)

(56) References Cited

U.S. PATENT DOCUMENTS 6,147,580 A * 11/2000 Rettew .................. H01F 27/327 336/60
2003/0202308 A1* 10/2003 Flores-Jauregui ... H01H 33/664 361/102
(Continued)

FOREIGN PATENT DOCUMENTS

CN 1873855 A * 12/2006
CN 101208003 A 6/2008
(Continued)

OTHER PUBLICATIONS

Second Chinese Office Action for Chinese Patent Application No. CN 2020800541082 mailed Nov. 8, 2023, 9 pages (includes English summary).
(Continued)

*Primary Examiner* — Shawki S Ismail
*Assistant Examiner* — Joselito S. Baisa
(74) *Attorney, Agent, or Firm* — Sage Patent Group

(57) ABSTRACT

A transformer cooling system, includes a dry transformer having a core including a leg, a winding body arranged around the leg, and a cooling channel extending in a direction of a longitudinal axis of the winding body. The cooling channel is disposed between an inner part of the winding body and an outer part of the winding body. The transformer cooling system further includes a housing for containing the dry transformer. The housing has an inlet portion for receiving air from outside the housing and an outlet portion for expelling air outside the housing. The transformer cooling system further includes a flow generating device arranged at the outlet portion and adapted to generate an under pressure for sucking the air from the inlet portion towards the flow generating device and to expel the air through the outlet portion outside the housing.

15 Claims, 7 Drawing Sheets

(51) Int. Cl.
*H01F 27/28* (2006.01)
*H01F 27/32* (2006.01)

(58) Field of Classification Search
USPC .................................................... 336/55, 60
See application file for complete search history.

(56) References Cited

U.S. PATENT DOCUMENTS

| | | | | |
|---|---|---|---|---|
| 2010/0328005 | A1* | 12/2010 | Sarver | H01F 27/327 336/199 |
| 2013/0181796 | A1* | 7/2013 | Weber | H01F 27/36 336/60 |
| 2016/0027568 | A1 | 1/2016 | Takauchi et al. | |
| 2019/0103774 | A1 | 4/2019 | Takahashi | |
| 2019/0362879 | A1 | 11/2019 | Tepper et al. | |

FOREIGN PATENT DOCUMENTS

| | | | | | |
|---|---|---|---|---|---|
| CN | 101548348 | B | | 9/2009 | |
| CN | 205159038 | U | * | 4/2016 | |
| CN | 207587476 | U | * | 7/2018 | |
| CN | 207938414 | U | * | 10/2018 | |
| CN | 208571330 | U | * | 3/2019 | |
| CN | 208623215 | U | * | 3/2019 | |
| CN | 114400553 | A | * | 4/2022 | |
| DE | 102017102436 | A1 | * | 8/2018 | H01F 27/085 |
| EP | 2151833 | A | | 2/2010 | |
| EP | 2151833 | B1 | * | 3/2013 | H01F 27/085 |
| EP | 3888105 | A1 | | 6/2020 | |
| JP | S5795007 | U | | 6/1982 | |
| JP | 2000232022 | A | | 8/2000 | |
| JP | 2006166643 | A | | 6/2006 | |
| JP | 2016219688 | A | | 12/2016 | |
| WO | WO-2020108869 | A1 | * | 6/2020 | H01F 27/025 |

OTHER PUBLICATIONS

Chinese First Office Action for Chinese Patent Application No. CN 2020800541082 mailed Jun. 15, 2023, 10 pages (includes English summary).

European Office Action for European Patent Application No. 19188662.1 mailed Jan. 2, 2023, 10 pages.

International Search Report and Written Opinion of the International Searching Authority, PCT/EP2020/070536, mailed Nov. 25, 2020, 17 pages.

Extended European Search Report dated Feb. 5, 2020 for European Patent Application No. 19188662.1, 12 pages.

* cited by examiner (a)

(b)

TRANSFORMER COOLING SYSTEM

CROSS REFERENCE TO RELATED APPLICATIONS

This application is a 35 U.S.C. § 371 national stage application of PCT International Application No. PCT/EP2020/070536 filed on Jul. 21, 2020, which in turn claims foreign priority to European Patent Application No. 19188662.1, filed on Jul. 26, 2019, the disclosures and content of which are incorporated by reference herein in their entirety.

TECHNICAL FIELD

Embodiments of the present disclosure relate to systems for cooling electrical power devices, in particular power transformers. In particular, embodiments of the present disclosure relate to systems for cooling dry transformers, particularly dry type transformers in non-ventilated housings with forced air cooling inside the housing.

BACKGROUND

Various techniques have been proposed to improve the cooling of dry transformers. These include cooling air ducts within the core to improve heat dissipation. Typically, an overpressure is generated in the lower part of the transformer housing by means of a fan, while a lower pressure is created in an upper part of the housing by extracting the air from the upper part. In this way, an air flow is generated which flows from the bottom of the transformer upwards, that is from the inlet to the outlet of the housing and then through a grid into the environment outside the housing. However, it has been found that a large amount of air does not flow through the cooling ducts within the windings as desired, but flows around the outside of the coils. One reason for this is that the cross-sectional area of the cooling channels within the windings is usually considerably smaller than the cross-sectional area between the housing wall and the coils.

In the state of the art, this problem is addressed by positioning air guidance plates in the immediate vicinity of the coils to improve the flow resistance of the area outside the coils to larger than the flow resistance of the cooling channels. However, in order to be sufficiently effective, the air guide plates must be individually adapted to the contours of the coils, which involves a considerable amount of work. Further, due to the fact that the air guide plates also generate considerable additional flow turbulence, the ventilation system operates with a lower overall efficiency.

With exemplary reference to FIG. 1, a known transformer cooling system 100' is described. The transformer cooling system 100' includes a dry transformer 1 with a core 10 having a leg 11 as well as a winding body 12 arranged around the leg 11.

Additionally, as exemplarily shown in FIGS. 2*a* and 2*b*, the dry transformer 1 includes a cooling channel 13 extending in a direction of a longitudinal axis 14 of the winding body 12. The cooling channel 13 is disposed between an inner part 121 of the winding body 12 and an outer part 122 of the winding body 12. Typically, the inner part 121 of the winding body 12 is a low voltage (LV) winding and the outer part 122 of the winding body 12 is a high voltage (HV) winding. Further, the cooling channel 13 has a cooling channel inlet 131 provided at a first end of the cooling channel 13 and a cooling channel outlet 132 provided at a second end of the cooling channel 13. For instance, as shown in FIG. 2*b*, the cooling channel 13 typically—but not necessarily—has an essentially ring-like or annular cross section. For example, as shown in FIG. 2*a*, typically the cooling channel 13 has an internal cooling channel diameter d1 and an external cooling channel diameter d2, the air flow 133 passing through the space defined by the internal and external diameter.

It is to be understood that a transformer including a cooling channel can include one or more cooling channels. Typically, a channel between low voltage (LV) winding and high voltage (HV) is referred to as cooling channel. However, a cooling channel may also refer to other channels provided in the winding body, e.g. within the high voltage (HV) winding and/or within the low voltage (LV) winding.

Further, as exemplarily shown in FIG. 1, the transformer cooling system 100' includes a housing 20 for the dry transformer 1, the housing 20 comprising an inlet portion 22 and an outlet portion 24. Usually, the transformer cooling system 100' includes a device 3 for generating a cooling flow in the cooling channel 13. The device 3 is a ventilator arranged underneath the dry transformer 1 in a space 30 for collecting air from outside the housing 20, for example an heat exchanger. In order to provide airflow into the cooling channels 13, the ventilator 3 is positioned directly under the winding body 12 in the inlet portion 22 of the housing 20.

The ventilator 3 generates an overpressure in the inlet portion 22 of the housing 20. In this way, an air flow goes from the inlet portion 22 towards the outlet portion 24 and leaves the housing 20 through the grid 2 into the environment. To further improve the cooling effect by preventing the air stream to flow outside the cooling channel 13, guidance plates 44 are usually arranged at the inlet portion 22 close to the winding body 14.

However, in order to ensure sufficient air flow in the cooling channel 13 of the transformer, a large overpressure is needed to overcome the resistance in the housing 20. This requires a large effort for operation and higher power of the fan ventilator 3. Ventilators with high power may result in a large dimension and increase the space requirements for installation.

Accordingly, in view of the above, there is a demand for improved transformer cooling systems which overcome at least some of the problems of the state of the art.

SUMMARY

In light of the above, a transformer cooling system and a transformer installation according to the independent claims are provided. Further aspects, advantages, and features are apparent from the dependent claims, the description, and the accompanying drawings.

According to an aspect of the present disclosure, a transformer cooling system is provided. The transformer cooling system includes a dry transformer. The dry transformer includes a core including a leg. Further, the dry transformer includes a winding body arranged around the leg. A cooling channel extending in a direction of a longitudinal axis of the winding body is provided. The cooling channel is disposed between an inner part of the winding body and an outer part of the winding body. Additionally, the transformer cooling system includes a housing for containing the dry transformer. The housing comprises an inlet portion for receiving air from outside the housing and an outlet portion for expelling air outside the housing. Moreover, the transformer cooling system includes a flow generating device arranged at the outlet portion and adapted to generate an under pressure for sucking the air from the inlet portion towards the flow generating device and to expel the air through the outlet portion outside the housing.

Accordingly, a transformer cooling system of the present disclosure may provide increased cooling efficiency. In particular, by providing a flow generating device to create an under pressure in the outlet portion, the air flows through the housing with less efforts, the expensive outlet grid can be eliminated and the total volume of the transformer system can be reduced, since the bulky device (ventilator) for generating an overpressure at the inlet of the housing can be replaced by a more compact device for generating an under pressure at the outlet of the housing. Thus, the transformer cooling system as described herein may provide for a less complex design resulting in a reduction of costs.

According to a further aspect of the present disclosure, a transformer installation is provided. The transformer installation includes a first dry transformer and a second dry transformer, each of the first dry transformer and the second dry transformer being in accordance with the dry transformer described above. Additionally, the transformer installation includes a first housing for containing the first dry transformer and a second housing for containing the second dry transformer, the first housing being separate from the second housing.

Accordingly, a transformer installation of the present disclosure may reduce installation size and/or cooling efficiency compared to conventional transformer installations.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
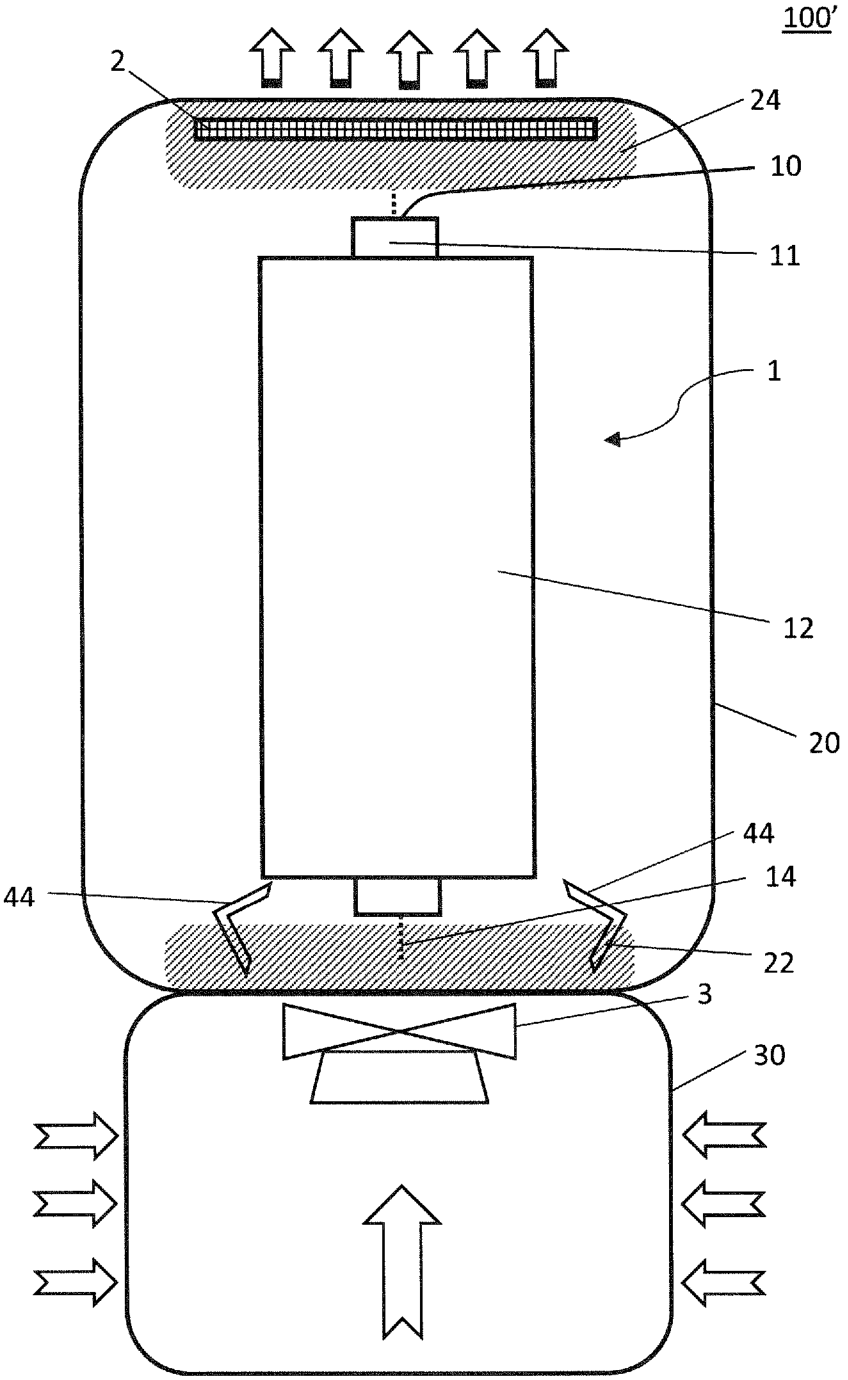
FIG. 1 shows a schematic view of a transformer cooling system according to embodiments of prior art.
Figure 2:
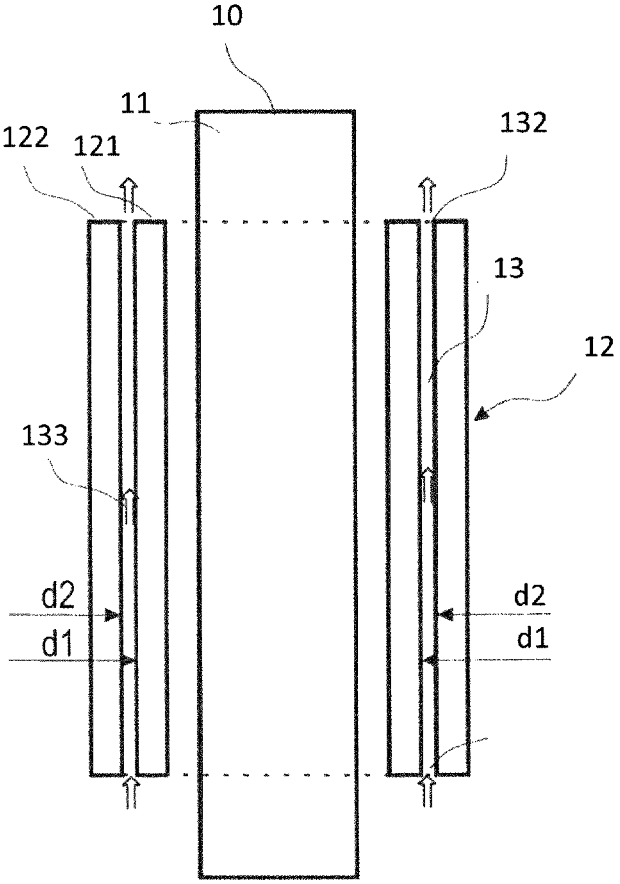
FIG. 2*a* shows a schematic view sectional view of a dry transformer.
FIG. 2*b* shows a schematic top view of the dry transformer of FIG. 2*a;*
Figure 2:
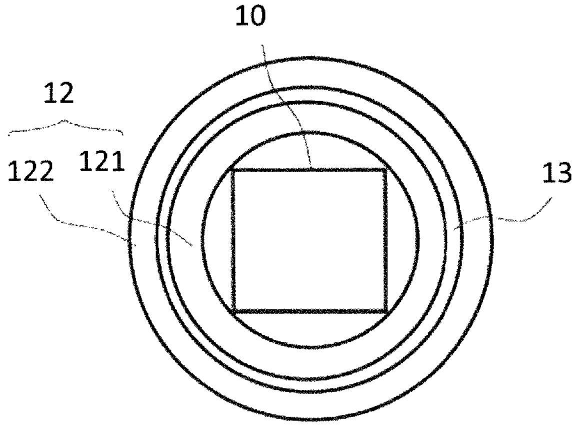
Figure 3:
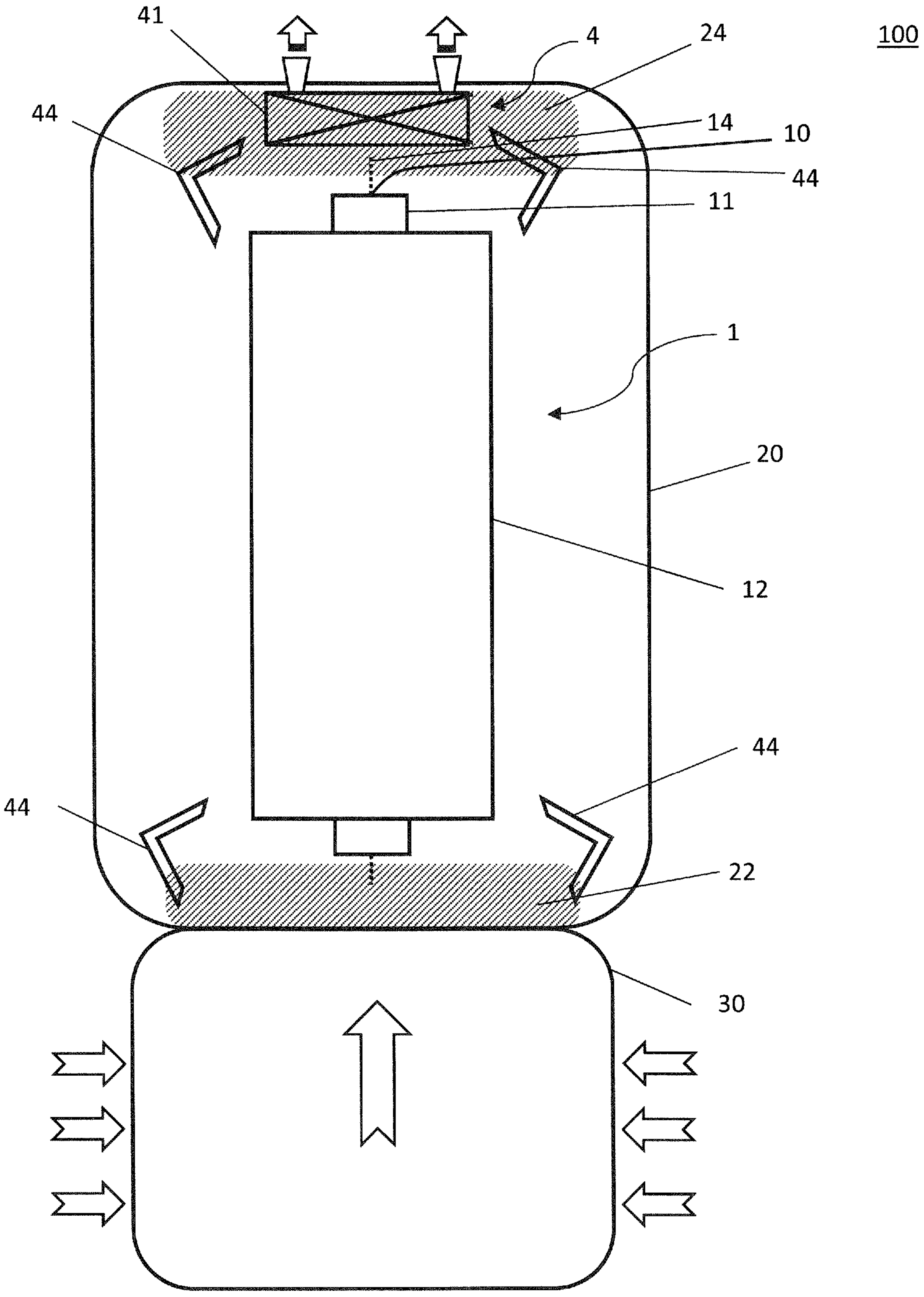
FIG. 3 shows a schematic view of a transformer cooling system according to embodiments described herein.

With exemplary reference to FIG. 3, according to some embodiments described therein, a transformer cooling system 100 comprises a dry transformer 1 having a core 10 with a leg 11 and a winding body 12 arranged around the leg 11. A cooling channel 13 (not shown in the FIG. 3 but analogous to that of FIGS. 2*a* and 2*b*) extends in the direction of a longitudinal axis 14 of the winding body 12. In particular, the cooling channel 13 is disposed between an inner part 121 of the winding body 12 and an outer part 122 of the winding body 12. The system 100 comprises furthermore a housing 20 for containing the dry transformer 1, the housing 20 having an inlet portion 22 for receiving air from outside the housing 20 and an outlet portion 24 for expelling air outside the housing 20. As shown in the figure, the inlet portion 22 is coupled to a space 30 collecting air from outside the system 100. The inlet and outlet portions 22, 24 are provided on opposite sides of the transformer housing 20, the opposite sides being spaced apart from each other in the longitudinal direction of the leg 11.

The transformer cooling system 100 furthermore comprises a flow generating device 4 arranged at the outlet portion 24 and adapted to generate an under pressure for sucking the air from the inlet portion 22 towards the flow generating device 4 and to expel the air through the outlet portion 24 outside the housing 20. In particular, the flow generating device 4 is arranged for generating the under pressure at an upstream side of the outlet portion 24. More specifically, the flow generating device 4 is arranged directly upstream of the outlet portion 24.

By positioning the flow generating device 4 at the outlet portion 24 of the housing 20, it is possible to create an under pressure that forces an air flow from the inlet portion 22 to the outlet portion 24 of the housing 20. It is noted that generating under pressure at the outlet portion 24 requires less effort and then less power consumption compared to generating over pressure at the inlet portion 22 in order to achieve the same cooling efficiency. Therefore, a system configuration according to this embodiment may reduce the overall power consumption for cooling the entire system. Also, this configuration may reduce the overall costs of production since the expensive outlet grid can be eliminated.

According to some embodiments, which can be combined with other embodiments described herein, the flow generating device 4 comprises a first flow generating unit 41 arranged at the outlet portion 24 to force an air stream to flow from the inlet portion 22 to the outlet portion 24 of the housing 20 through the cooling channel 13 of the dry transformer 1. The first flow generating unit 41 can be an active flow generating unit working during operation in a sucking mode, in particular an air pump.

In this way, a simple and compact air pump at the outlet of the housing 20 can replace bulky ventilators at the entrance of the housing 20, thereby reducing the total volume of the cooling transformer system 100.

Referring to FIG. 3, according to some embodiments, which can be combined with other embodiments described herein, the transformer cooling system 100 further comprises guidance plates 44 arranged in close proximity of the winding body 12 for guiding the air coming from the inlet portion 22 along the cooling channel 13 towards the outlet portion 24 of the dry transformer 1. In this way, the flow resistance through the cooling channel 13 becomes smaller than the flow resistance around the coils of the winding body 12. It is noted that the guidance plates 44 can be positioned at the inlet portion 22 as in prior art. Alternatively or additionally, the guidance plates 44 can be positioned at the outlet portion 24 in proximity of the opposite end of the winding body 12 in order to more efficiently suck the air flow from the cooling channel 13 of the dry transformer 12.

According to some embodiments, which can be combined with other embodiments described herein, the cooling channel 13 is arranged for guiding the air coming from the inlet portion 22 longitudinally through the winding body 12. In particular, the air is guided along the longitudinal axis 14 of the winding body 12.

Figure 4:
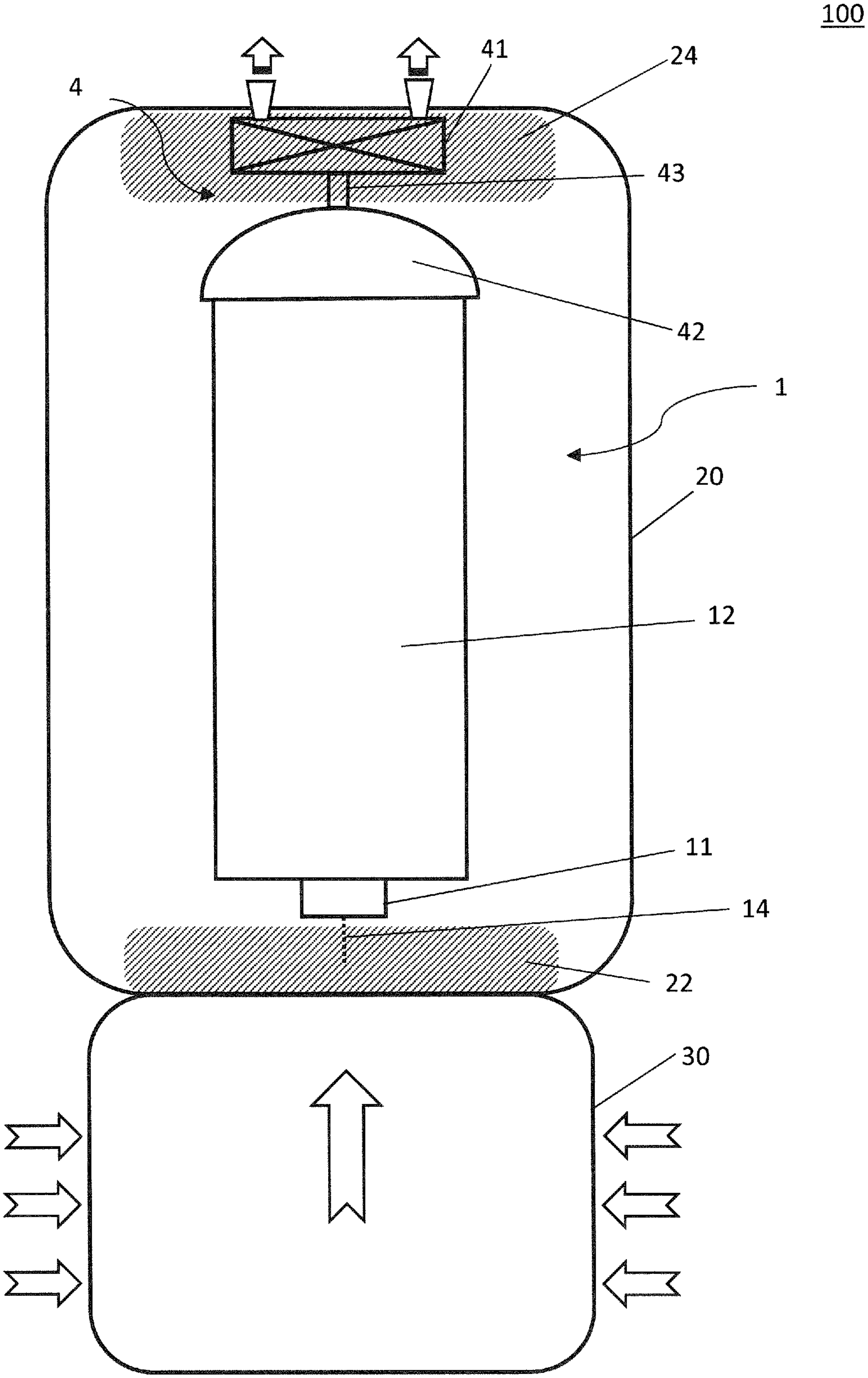
FIG. 4 shows a schematic view of a transformer cooling system according to further embodiments described herein.

With exemplary reference to FIG. 4, according to some embodiments, which can be combined with other embodiments described herein, the flow generating device 4 comprises a second flow generating unit 42 to create a further under pressure in the cooling channel 13 of the dry transformer 1. In particular, the second flow generating unit 42 is arranged upstream of the first flow generating unit 41 in the direction of the air stream.

It is noted that a combination of a first and second flow generating unit 41, 42, determines an under pressure at the outlet portion 24 able to force the air flow from the inlet to the outlet portion through the cooling channel 13 in a more efficient way. By such a configuration, the cooling process can effectively be carried out also without the necessity of guidance plates 44 and corresponding supporting elements and connections in proximity of the winding body 12, thereby reducing any possible flow turbulence determined by these elements.

According to some embodiments, which can be combined with other embodiments described herein, the second flow generating unit 42 is a pressure chamber located at one end of the winding body 12 of the dry transformer 1 and connected to the first flow generating unit 41 through at least an outlet tube 43. In particular, the air is directly sucked into the air pump 41 through the tube 43 and then blown directly into the environment. In this way, the air flows through the cooling channel 13 with a lower effort.

Figure 5:
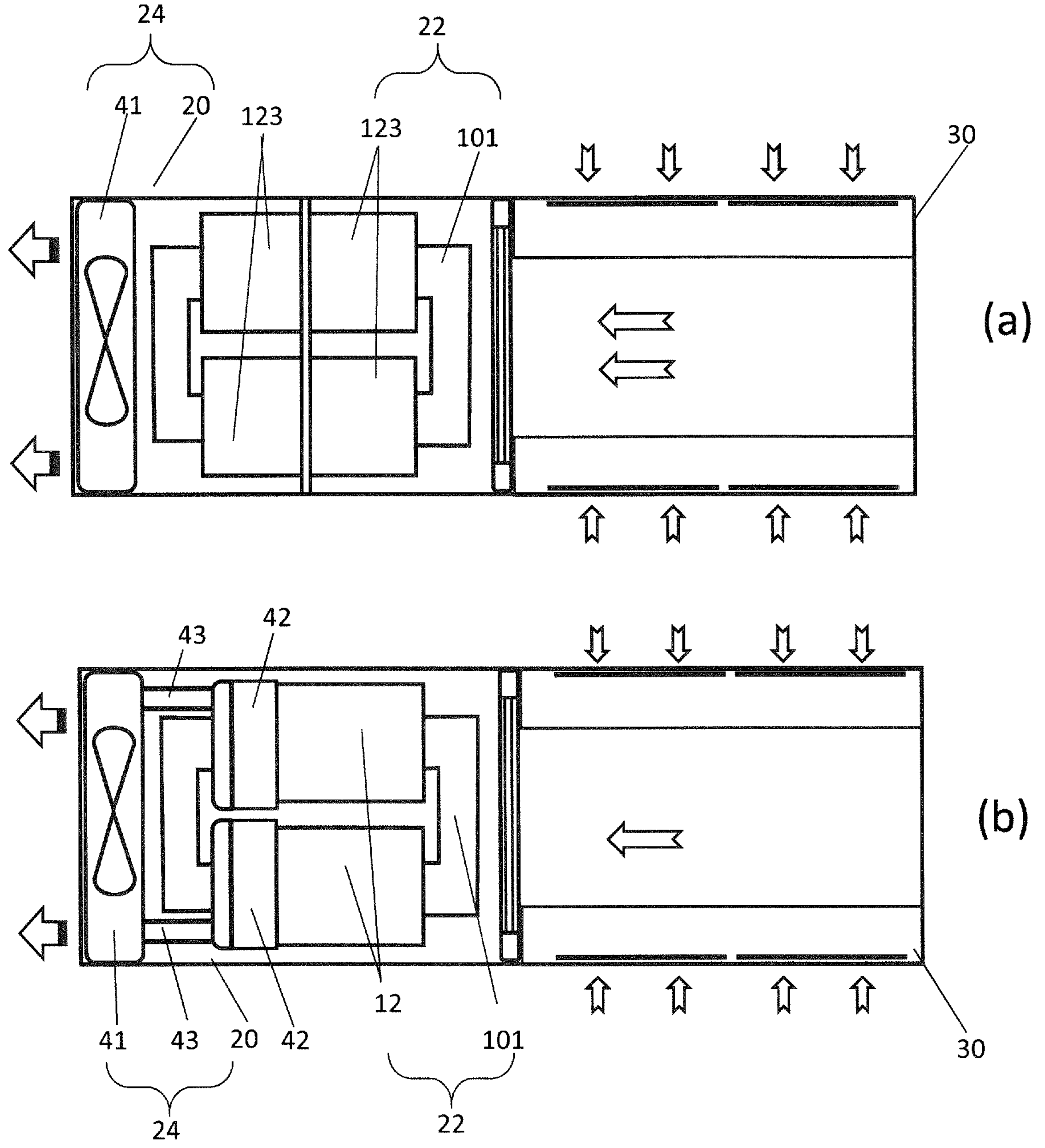
FIGS. 5*a* and 5*b* shows a schematic view of a transformer cooling system according to yet further embodiments described herein.

FIGS. 5*a* and 5*b* show two transformer cooling systems according to the embodiments of FIG. 3 and FIG. 4, respectively. In particular, the system of FIG. 5*a* comprises a first flow generating unit 41 defined by an air pump and FIG. 5*b* comprises a second flow generating unit 42 defined by a pressure chamber 42 coupled to the first flow generating unit 41, both flow generating units 41, 42 being arranged in the outlet portion 24 of the housing. 20. The second flow generating unit 42 is connected to the first flow generating unit 41 by means of outlet tubes 43 in order to favor a more efficient under pressure in the housing 20.

Specifically, the dry transformer 1 comprises a two-limb transformer core 101 surrounded on both of its limbs by hollow cylindrical winding elements 12. As regards FIG. 5*a*, the winding body 12 of the dry transformer 1 comprises two winding body segments 123 arranged separately in the longitudinal direction of the leg 11, wherein segment cooling channels are provided there between. As regards FIG. 5*a*, each winding body 12 comprises a pressure chamber 42 (or second flow generating unit) at one end (faced toward the outlet portion 24), each having an outlet tube 43 connected to the air pump 41.

Figure 6:
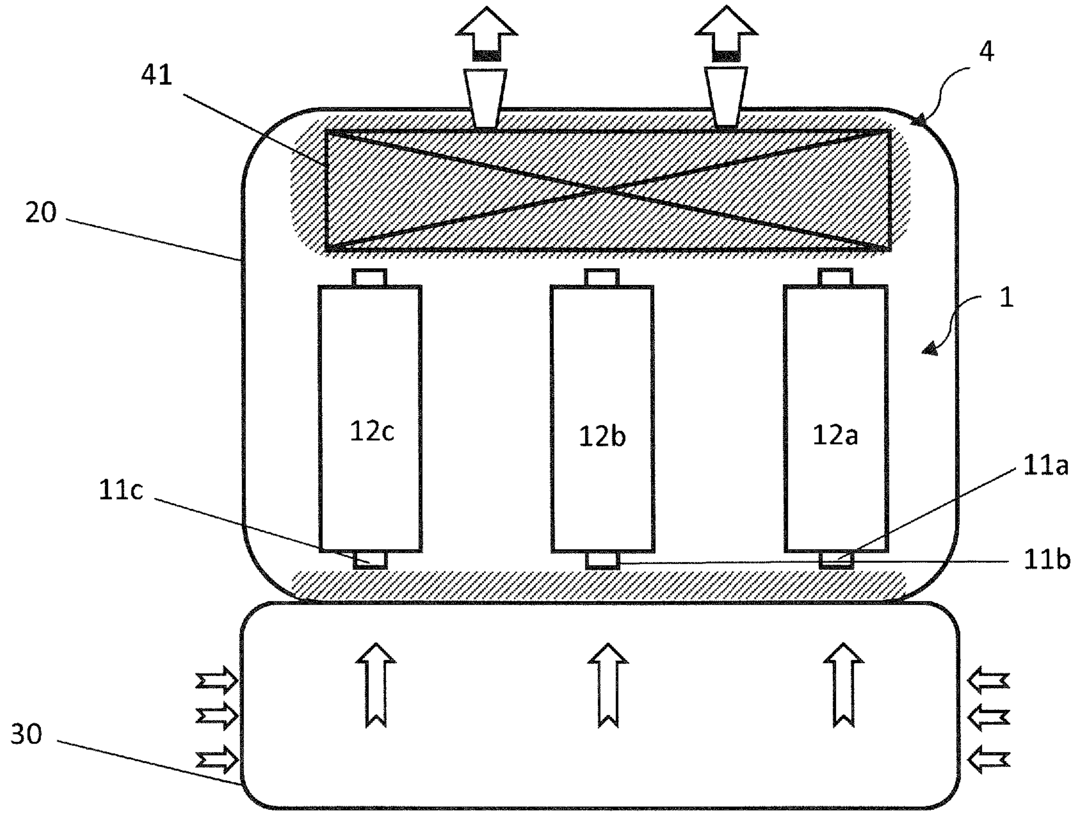
FIG. 6 shows a schematic view of a transformer cooling system for a three-phase dry transformer according to further embodiments described herein.

As shown in FIG. 6 according to some embodiments, which can be combined with other embodiments described herein, the dry transformer 1 can be a three-phase transformer including three legs 11*a*, 11*b*, 11*c* and three windings 12*a*, 12*b*, 12*c*. In particular, the three legs 11*a*, 11*b*, 11*c* and the three windings 12*a*, 12*b*, 12*c* can be configured as explained for the dry transformer shown in FIGS. 2*a* and 2*b*. It is noted that FIG. 6 shows a configuration, wherein the flow generating device 4 comprises an air pump as a first generating unit 41. However, other configurations are possible. For example, the flow generating device 4 can also comprise a pressure chamber as a second flow generating unit 42 coupled to the air pump 41, as described herein. In particular, the flow generating device 4 can comprise three pressure chambers 42*a*, 42*b*, 42*c*, each positioned at one end of the three windings 12*a*, 12*b*, 12*c*, respectively (not shown in the figure).

According to some embodiments, which can be combined with other embodiments described herein, the dry transformer 1 can be a traction transformer adapted for feeding a current to an electrical machine.

Figure 7:
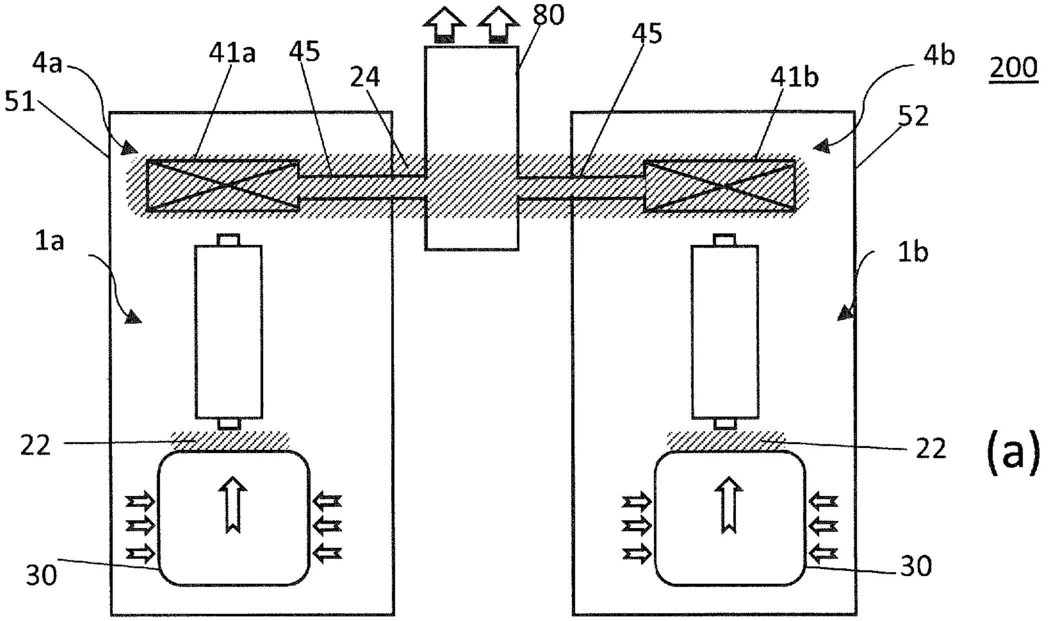
FIGS. 7*a* and 7*b* show a transformer installation according to embodiments described herein.
Figure 7:
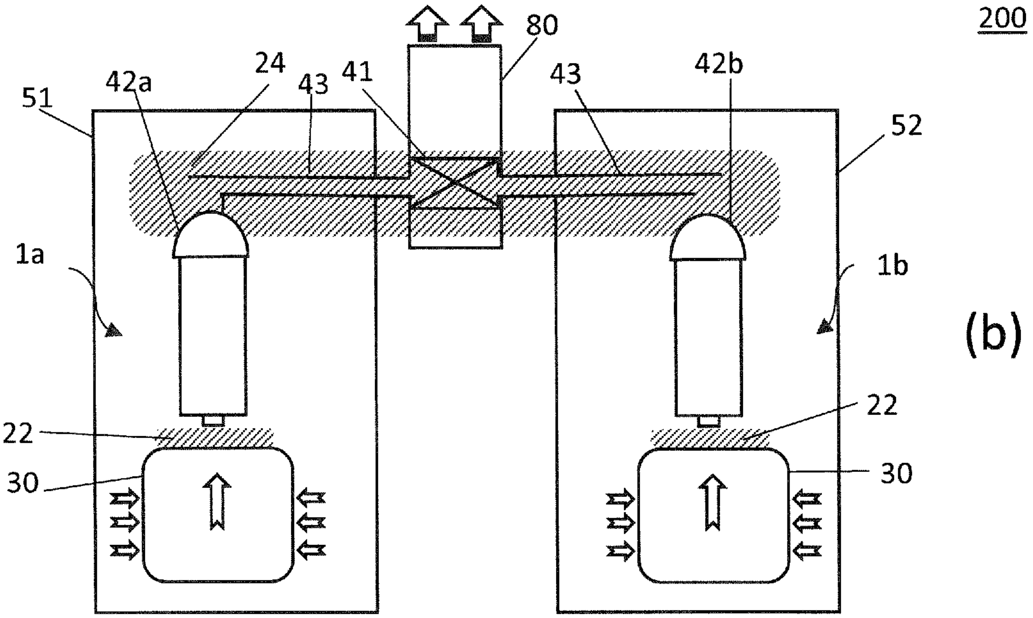

Additionally, as exemplarily shown in FIGS. 7*a* and 7*b*, the transformer installation 200 includes a first housing 51 for a first dry transformer 1*a* and a second housing 52 for a second dry transformer 1*b*. Both the first and the second dry transformer 1*a*, 1*b* can be a dry transformer as described herein. The two housing 51, 52 are separated from each other. Further, the transformer installation 200 includes an outlet chamber 80 in fluid communication with the first housing 51 and with the second housing 52. In particular, the outlet chamber 80 is adapted to receive air flow from the first housing 51 and from the second housing 52. It is noted that the transformer installation 200 can comprise more than two housings separated from each other, each housing including a corresponding dry transformer.

With reference to FIG. 7*a*, a first flow generating device 4*a* is arranged in the first housing 51 for providing a cooling flow in the cooling channel 13 of the first dry transformer 1*a*. The first flow generating device 4*a* comprises a first air pump 41*a* and is connected to the outlet chamber 80, particularly via a pipe 45. In particular, the first flow generating device 4*a* can be any flow generating device as described herein e.g. with reference to FIGS. 3 to 5*b*. In particular, the first flow generating device 4*a* may include a first flow generating unit 41 and/or second flow generating unit 42, as described herein.

Additionally, a second flow generating device 4*b* is arranged in the second housing 52 for providing a cooling flow in the cooling channel 13 of the second dry transformer 1*b*. The second flow generating device 4*b* comprises a second air pump 41*b* and is connected to the outlet chamber 80, particularly via a pipe 45. In particular, the second flow generating device 4*b* can be any flow generating device as described herein e.g. with reference to FIGS. 3 to 6. In particular, the second flow generating device 4*b* may include a first flow generating unit 41 and/or second flow generating unit 42, as described herein.

FIG. 7*a* shows a first and a second air pump (first generating units) 41*a*, 41*b* for both the first and the second dry transformer 1*a*, 1*b*. The air flow is sucked by the air pumps 41*a* and 41*b* from the cooling channel 13 of the first dry transformer 1*a* and second dry transformer 1*b*, respectively. The pumped air is then guided through the pipe 45 in the outlet chamber 80 and then outside the installation 200.

With reference to FIG. 7*b*, the flow generating device 4 comprises a single common first flow generating unit 41 in the form of an air pump and two second flow generating unit 42*a*, 42*b* in the form of a pressure chamber positioned at one end of the winding body 12 of each of the first dry transformer 1*a* and of the second dry transformer 1*b*, respectively. The common first flow generating unit 41 is located inside the outlet chamber 80 and is connected through outlet tubes 43 to the two pressure chambers 42_a_, 42_b_. The air flow is sucked by the air pump 41 in connection with the first pressure chamber 42_a_ and the second pressure chamber 42_b_ from the cooling channel 13 of the first dry transformer 1_a_ and second dry transformer 1_b_, respectively. The pumped air is then guided in the outlet chamber 80 and then outside the installation 200.

In view of the above, it is to be understood that embodiments of the present disclosure have one or more of the following advantages. Compared to the state of the art, the overall volume of the system can may be considerably reduced. In fact, the air pump for generating an under pressure at the outlet portion of the housing may be more compact than the ventilator apparatus required for generating an over pressure at the inlet portion of the housing. Also, by using the air pump instead of a ventilator apparatus, the power consumption may be strongly decreased, the cooling efficiency being the same. In addition, compared to the state of the art, some air guidance plates (incl. support structure, connections, cut-outs) can be eliminated. In fact, by combining two flow generating units at the outlet portion, such as an air pump and a pressure chamber connected to each other through outlet tubes, the cooled air can be directly guided to flow from the cooling channels directly to outside the housing. In addition, since the air pump is directly located at the outlet portion of the housing, some expensive outlet grid structures can be eliminated. This some may considerably reduce the production costs. The installation of transformers with shared elements, such as a common outlet chamber or a common flow generating unit may further reduce the size of transformer system.

While the foregoing is directed to embodiments, other and further embodiments may be devised without departing from the basic scope, and the scope is determined by the claims that follow.

REFERENCE NUMBERS

1 dry transformer
1_a_, 1_b_ first and second dry transformer
2 grid
3 ventilator
4 flow generating device
4_a_, 4_b_ first and second flow generating device
10 core
11 legs
11_a_, 11_b_, 11_c_ legs of three-phase transformer
12 winding body
12_a_, 12_b_, 12_c_ windings of three-phase transformer
13 cooling channel
14 longitudinal axis
20 housing
22 inlet portion
24 outlet portion
30 space
41 first flow generating unit
42 second flow generating unit
43 outlet tube
44 guidance plates
45 pipe
51 first housing
52 second housing
80 outlet chamber
100, 100' transformer cooling system
101 two limb core
121 inner part of the winding body
122 outer part of the winding body
123 winding body segment
131 cooling channel inlet
132 cooling channel outlet
133 air flow in the cooling channel
200 transformer installation
d1 internal cooling channel diameter
d2 outer cooling channel diameter

The invention claimed is:

1. A transformer cooling system comprising:
a dry transformer comprising:
a core comprising:
a leg;
a winding body arranged around the leg; and
a cooling channel extending in a direction of a longitudinal axis of the winding body, wherein the cooling channel is disposed between an inner part of the winding body and an outer part of the winding body;
a housing for containing the dry transformer, the housing having an inlet portion for receiving air from outside the housing and an outlet portion for expelling air outside the housing; and
a flow generating device arranged at the outlet portion and adapted to generate an under pressure for sucking the air from the inlet portion towards the flow generating device and to expel the air through the outlet portion outside the housing, wherein the flow generating device comprises a first flow generating unit arranged at the outlet portion to force an air stream to flow from the inlet portion to the outlet portion of the housing through the cooling channel of the dry transformer and a second flow generating unit arranged upstream of the first flow generating unit in the direction of the air stream to create a further under pressure in the cooling channel of the dry transformer;
wherein the second flow generating unit comprises a pressure chamber located within and separate from the housing, wherein the pressure chamber is connected at one end of the winding body of the dry transformer and connected to the first flow generating unit through at least an outlet tube.

2. The transformer cooling system of claim 1, wherein the first flow generating unit is an active flow generating unit working during operation in a sucking mode.

3. The transformer cooling system of claim 1, further comprising guidance plates arranged for guiding the air coming from the inlet portion along a close proximity of the winding body towards the outlet portion of the dry transformer.

4. The transformer cooling system of claim 1, wherein the cooling channel is arranged for guiding the air coming from the inlet portion longitudinally through the winding body.

5. The transformer cooling system of claim 1, wherein the winding body of the dry transformer comprises two winding body segments arranged separately in the longitudinal direction of the leg, wherein segment cooling channels are provided there between.

6. The transformer cooling system of claim 1, wherein the dry transformer comprises a two-limb transformer core surrounded on both of its limbs by hollow cylindrical winding elements.

7. The transformer cooling system of claim 1, wherein the inlet and outlet portions are provided on opposite sides of the transformer housing, the opposite sides being spaced apart from each other in the longitudinal direction of the leg.

8. The transformer cooling system of claim 1, wherein the flow generating device is arranged for generating the under pressure at an upstream side of the outlet portion.

9. The transformer cooling system of claim 1, wherein the flow generating device is arranged directly upstream of the outlet portion.

10. The transformer cooling system of claim 1, wherein the dry transformer is a three-phase transformer comprising three legs and three windings.

11. The transformer cooling system of claim 1, wherein the dry transformer is a traction transformer adapted for feeding a current to an electrical machine.

12. A transformer installation comprising:

a first dry transformer comprising:

a first core comprising:

a first leg;

a first winding body arranged around the first leg;

a first cooling channel extending in a direction of a longitudinal axis of the first winding body, wherein the first cooling channel is disposed between an inner part of the first winding body and an outer part of the first winding body;

a first housing for containing the first dry transformer, the first housing having a first inlet portion for receiving air from outside the housing and a first outlet portion for expelling air outside the first housing;

a flow generating device arranged at the first outlet portion and adapted to generate an under pressure for sucking the air from the first inlet portion towards the flow generating device and to expel the air through the first outlet portion outside the first housing, wherein the flow generating device comprises a first flow generating unit arranged at the first outlet portion to force an air stream to flow from the first inlet portion to the first outlet portion of the first housing through the first cooling channel of the first dry transformer and a second flow generating unit arranged upstream of the first flow generating unit in the direction of the air stream to create a further under pressure in the first cooling channel of the first dry transformer; and a second dry transformer comprising:

a second core comprising:

a second leg;

a second winding body arranged around the second leg; and a second cooling channel extending in a direction of a longitudinal axis of the second winding body, wherein the second cooling channel is disposed between an inner part of the second winding body and an outer part of the second winding body;

a second housing for containing the second dry transformer, the second housing having a second inlet portion for receiving air from outside the housing and a second outlet portion for expelling air outside the second housing; and the flow generating device further arranged at the second outlet portion and adapted to generate an under pressure for sucking the air from the second inlet portion towards the flow generating device and to expel the air through the second outlet portion outside the second housing, wherein the first flow generating unit is further arranged at the second outlet portion to force an air stream to flow from the second inlet portion to the second outlet portion of the second housing through the second cooling channel of the second dry transformer, and wherein the flow generating device further comprises another second flow generating unit arranged upstream of the first flow generating unit in the direction of the air stream to create a further under pressure in the second cooling channel of the second dry transformer, wherein the respective first and second housings of the first and second dry transformers are separate from each other; and wherein the second flow generating units comprise a respective pressure chamber located within and separate from their respective housings, wherein the pressure chamber is connected at one end of the winding body of the first and second dry transformers and connected to the first flow generating unit through at least an outlet tube.

13. A dry transformer comprising:

a housing having an inlet portion for receiving air from outside the housing and an outlet portion for expelling air outside the housing;

a core arranged within the housing;

a winding body arranged around the core;

a cooling channel extending in a direction of a longitudinal axis of the winding body, wherein the cooling channel is disposed within the winding body; and a flow generating device arranged within the housing at the outlet portion and adapted to generate an under pressure for sucking the air from the inlet portion towards the flow generating device and to expel the air through the outlet portion outside the housing, wherein the flow generating device comprises a first flow generating unit arranged at the outlet portion to force an air stream to flow from the inlet portion to the outlet portion of the housing through the cooling channel of the dry transformer and a second flow generating unit arranged upstream of the first flow generating unit in the direction of the air stream to create a further under pressure in the cooling channel of the dry transformer;

wherein the second flow generating unit comprises a pressure chamber located within and separate from the housing, wherein the pressure chamber is connected at one end of the winding body of the dry transformer and connected to the first flow generating unit through at least an outlet tube.

14. The dry transformer of claim 13, wherein the first flow generating unit is an active flow generating unit working during operation in a sucking mode, in particular an air pump.

15. The dry transformer of claim 13, further comprising guidance plates arranged for guiding the air coming from the inlet portion along a close proximity of the winding body towards the outlet portion of the dry transformer.

* * * * *